(12) United States Patent
Yang et al.

(10) Patent No.: US 10,378,588 B2
(45) Date of Patent: Aug. 13, 2019

(54) RETAINER FOR ROTATING MEMBERS

(71) Applicant: GKN Automotive Limited, Worcestershire (GB)

(72) Inventors: Lei Yang, Novi, MI (US); Christopher M. Zagacki, Ferndale, MI (US)

(73) Assignee: GKN Automotive Limited, Worcestershire (GB)

( * ) Notice: Subject to any disclaimer, the term of this patent is extended or adjusted under 35 U.S.C. 154(b) by 305 days.

(21) Appl. No.: 15/409,748

(22) Filed: Jan. 19, 2017

(65) Prior Publication Data

US 2018/0202496 A1   Jul. 19, 2018

(51) Int. Cl.
*F16D 1/04* (2006.01)
*F16B 21/18* (2006.01)
*F16C 35/067* (2006.01)

(52) U.S. Cl.
CPC ............ *F16D 1/04* (2013.01); *F16B 21/18* (2013.01); *F16B 21/183* (2013.01); *F16B 21/186* (2013.01); *F16C 35/067* (2013.01)

(58) Field of Classification Search
CPC .... F16D 1/116; F16D 2001/103; F16D 21/18; F16D 21/183; F16D 21/186; Y10T 403/7033
USPC ........................................................ D8/396
See application file for complete search history.

(56) References Cited

U.S. PATENT DOCUMENTS

| 1,665,875 | A | * | 4/1928 | Melburn | F16B 21/10 |
| | | | | | 411/337 |
| 2,648,557 | A | | 8/1953 | Stewart, Sr. | |
| 2,755,698 | A | * | 7/1956 | Wurzel | F16B 21/186 |
| | | | | | 411/517 |
| 2,760,258 | A | * | 8/1956 | Rieger | F16B 3/04 |
| | | | | | 285/321 |
| 2,811,889 | A | * | 11/1957 | Wurzel | F16B 21/183 |
| | | | | | 24/1 |
| 3,595,123 | A | | 7/1971 | Wurzel | |

(Continued)

FOREIGN PATENT DOCUMENTS

| CA | 1271346 A | 7/1990 |
| CN | 202118061 U | 1/2012 |

(Continued)

OTHER PUBLICATIONS

Written Opinion & International Search Report for PCT Application No. PCT/IB2018/000370 dated Jun. 28, 2018 (13 pages).

*Primary Examiner* — Joshua T Kennedy
(74) *Attorney, Agent, or Firm* — Jennifer M. Braumbaugh; Reising Ethington P.C.

(57) ABSTRACT

A retainer for coupling rotating shafts includes a body and a finger. The body may have a curved section extending in a circumferential direction about an axis and a pair of ends. The finger extends from the body and has a least a portion that extends inwardly toward the axis. The finger may be flexible and resilient and have an at rest state and a second state wherein the finger flexes outwardly away from the axis when acted upon by a sufficient force, and the finger returns toward its at rest state when the force is reduced or removed from the finger. When a second shaft is partially inserted into a first shaft, an object may engage and flex the finger until the object passes by the finger whereupon the finger may return toward the at rest state partially overlapping the object.

18 Claims, 9 Drawing Sheets

(56) References Cited

U.S. PATENT DOCUMENTS

| | | | |
|---|---|---|---|
| 3,752,514 A * | 8/1973 | Schoeps | B25B 23/0035 403/328 |
| 4,136,982 A * | 1/1979 | Sagady | F16B 21/18 403/108 |
| 5,059,844 A | 10/1991 | Anstine | |
| 5,785,433 A * | 7/1998 | Takahashi | F16C 35/067 384/539 |
| 6,113,306 A | 9/2000 | Allert | |
| 6,902,325 B1 * | 6/2005 | Uchman | B60B 27/00 384/544 |
| 7,111,819 B2 * | 9/2006 | Mikiya | F16L 37/42 251/149.6 |
| 7,494,189 B2 | 2/2009 | Otto | |
| 8,277,330 B2 * | 10/2012 | Szentmihalyi | F16D 1/10 464/182 |
| 8,919,707 B2 * | 12/2014 | Lee | H02G 3/30 248/56 |
| 9,438,089 B2 * | 9/2016 | Perisho | H02K 7/08 |
| 9,810,267 B2 * | 11/2017 | Hale | F16C 35/067 |
| 2004/0247383 A1 | 12/2004 | Chang et al. | |
| 2005/0088036 A1 * | 4/2005 | Myers | B60B 27/00 301/105.1 |
| 2005/0214101 A1 | 9/2005 | Dexter et al. | |
| 2007/0103263 A1 * | 5/2007 | Gutierrez | F16B 21/18 335/220 |
| 2009/0217493 A1 * | 9/2009 | Greenhill | F16D 1/116 24/457 |
| 2014/0116184 A1 | 5/2014 | Clark et al. | |
| 2015/0224821 A1 * | 8/2015 | Nollenberger | F16B 21/186 384/539 |

FOREIGN PATENT DOCUMENTS

| | | | |
|---|---|---|---|
| DE | 102005002853 B3 | 4/2006 | |
| DE | 102014220857 A1 * | 4/2016 | F16B 21/18 |
| DE | 102014220857 A1 | 4/2016 | |
| EP | 2388486 A1 | 11/2011 | |
| JP | H0480911 U | 7/1992 | |
| JP | 2004324828 A | 11/2004 | |
| WO | WO0127485 A1 | 4/2001 | |
| WO | WO-2015117997 A1 * | 8/2015 | F16B 21/183 |
| WO | WO2015200623 A1 | 12/2015 | |

* cited by examiner

US 10,378,588 B2

RETAINER FOR ROTATING MEMBERS

TECHNICAL FIELD

The present disclosure relates generally to a retainer for rotating members, such as rotating shafts in a vehicle drive unit.

BACKGROUND

A vehicle driveline transmits torque from an engine or motor to one or more wheels. Automotive drivelines sometimes include rear or front drive units, and power transfer units (PTUs, also known as power take-off units) for selectively distributing torque among shafts in the driveline. Two shafts of the PTU or other driveline device may need to be coupled together and the relative axial movement of the shafts constrained by a coupler. Packaging in automotive drivelines, as elsewhere in automobiles, often demands inflexible size constraints which can frustrate or prevent installation of the shafts and any coupler on the shafts, or require a coupler of a size and shape that may be damaged (e.g. plastically deformed or broken) during installation. Further, some connections are done blind, that is, the area of the connection between the shafts is not accessible or visible during assembly. This may be due to, for example, components that surround or enclose all or part of an area outboard of the connection between the shafts.

SUMMARY

In at least some implementations, a retainer for coupling rotating shafts includes a body and a finger. The body may have a curved section extending in a circumferential direction about an axis and a pair of ends. The finger extends from the body and has a least a portion that extends inwardly toward the axis. The finger may be flexible and resilient and have an at rest state and a second state wherein the finger flexes outwardly away from the axis when acted upon by a sufficient force, and the finger returns toward its at rest state when the force is reduced or removed from the finger.

In at least some implementations, an assembly includes a first shaft, a second shaft and a retainer. The first shaft has an axis of rotation, an outer surface defining an outer diameter, a cavity defining an inner surface that defines an inner diameter of the first shaft and a groove having at least a portion open to the cavity. The second shaft has an axis of rotation and at least a portion with an outer diameter smaller than the inner diameter so that said at least a portion can be at least partially received within the internal cavity. And the retainer may have a c-shaped body that includes a curved section received in the groove and a finger having a least a portion that extends inwardly toward the axis and projects into the cavity beyond the inner surface of the first shaft. The finger may be flexible and have an at rest state when not acted upon by a force sufficient to flex the finger and a second state wherein the finger flexes outwardly away from the axis when acted upon by a sufficient force. The finger may further be resilient so the finger returns toward its at rest state when the force is reduced or removed from the finger.

BRIEF DESCRIPTION OF THE DRAWINGS

The following detailed description of preferred embodiments and best mode will be set forth with reference to the accompanying drawings, in which.

DETAILED DESCRIPTION

Figure 1:
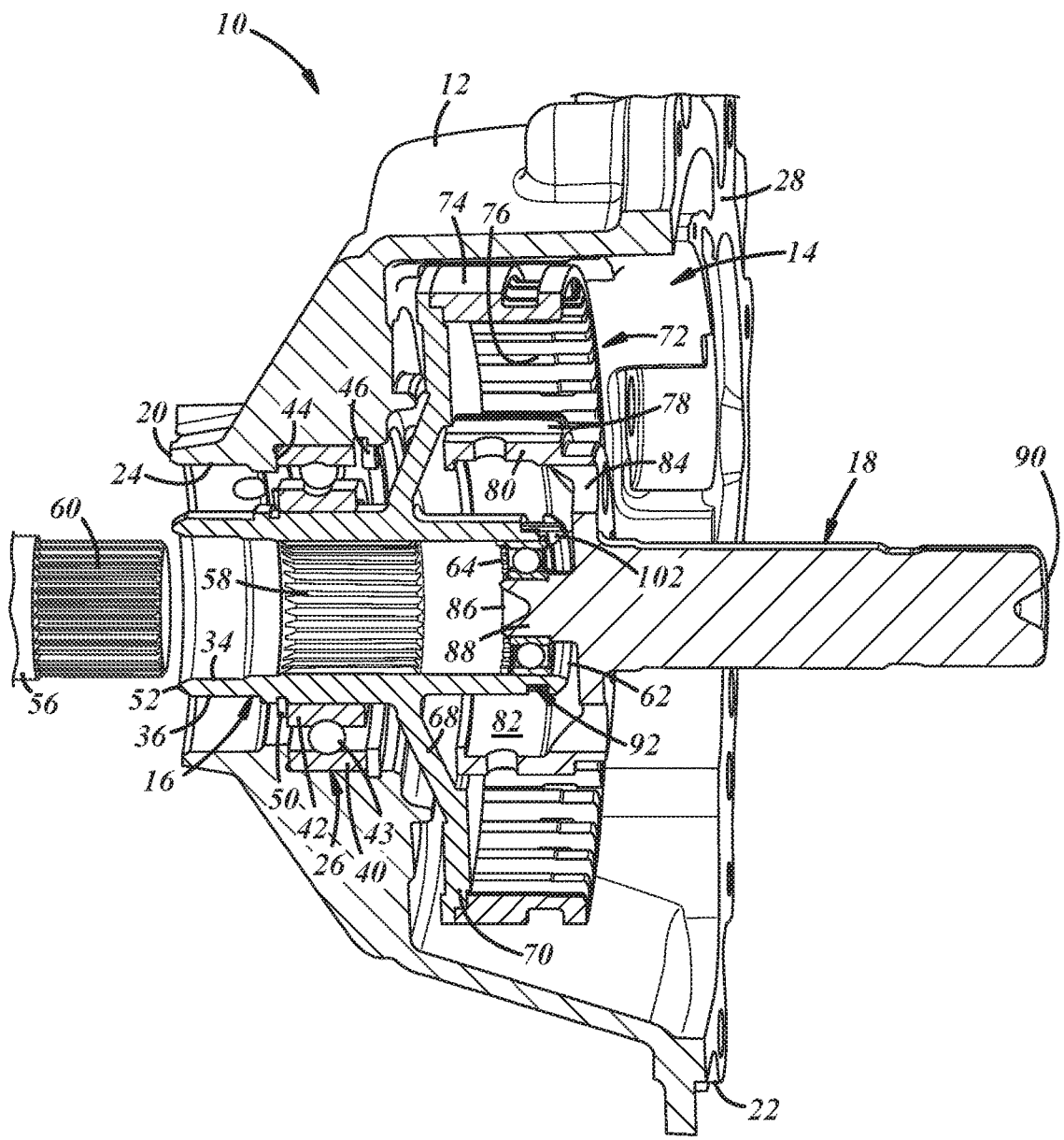
FIG. 1 is a cross-sectional view of a portion of a vehicle final drive unit.

Referring in more detail to the drawings, FIG. 1 illustrates a portion of a rear drive unit 10 for a vehicle driveline. The rear drive unit 10 includes an outer housing 12 that defines at least part of an interior 14 in which interconnected ends of a first shaft 16 and a second shaft 18 are received, and which may include a clutch including a plate pack and the like that cooperate with the shafts 16, 18 to provide a desired coupling and rotation of the shafts. While the following description will focus on the rear drive unit shown, the various concepts, features and combinations of features may be applied to other driveline components, including but not limited to, front drive units, power transfer units and the like, and other assemblies with coupled rotating shafts.

The outer housing 12 may be adapted to be joined to another housing component in an assembly and thus, might not define a complete enclosure by itself. In the example shown, the housing 12 is generally bowl or bell shaped with a narrower first end 20 and a wider second end 22. The first end 20 may include a passage 24 in which the first shaft 16 may be journalled for rotation such as by one or more bearings 26 received between the housing 12 and first shaft 16. The second end 22 may have a mounting face 28 adapted to be sealed and connected to an adjacent housing. The mounting face 28 may circumferentially surround the interior 14, and the second shaft 18 may protrude from the housing 12 so that it may be coupled to an adjacent driveline component like a spool shaft, a differential or the like. The passage 24 is open to the interior 14 and may be considered to define part of the interior of the housing 12.

In the implementation shown and as noted above, the rear drive unit 10 includes the first shaft 16 that is coupled to the second shaft 18 to transmit rotation among the shafts. The first shaft 16 may include a generally tubular main body 30 and a flange 32 connected to the main body 30. The main body 30 may be hollow defining an interior surface 34 and an exterior surface 36, and adapted for rotation about a central axis 38. To facilitate and guide rotation of the first shaft 16, one or more bearings 26 may be provided. In the example shown, a roller bearing 26 is provided with an outer race 40 engaged with the housing 12, an inner race 42 engaged with the exterior surface 36 of the main body 30 and a plurality of roller elements 43 (e.g. balls) between the races. The outer race 40 may be trapped axially between a shoulder or stop surface 44 of the housing 12 and a first retainer clip 46. Similarly, the inner race 42 may be received against a second retainer clip 50 received in a groove 48. In the example shown, the bearing 26 is inserted into the passage 24 from the direction of the second end 22 of the housing 12 toward the first end 20 of the housing until the bearing 26 abuts the shoulder 44 which is axially opposed to the direction of insertion of the bearing. Thereafter, the first retainer clip 46 is installed to retain the position of the bearing 26 relative to the housing 12.

Next, the first shaft 16 is installed, again in the direction from the housing second end 22 to the housing first end 20, with a first end 52 of the main body 30 received through the inner race 42. Finally, the second retainer clip 50 may be installed on the main body 30 from a direction opposite to the direction of installation of the main body 30 relative to the bearing 26. In other words, the second retainer clip 50 may be inserted into the passage 24 through the first end 20 of the housing 12 and installed into the groove 48 on the first shaft 16. In this way, the axial position of the bearing 26 and the first shaft 16 are maintained relative to the housing 12 and each other.

Figure 2:
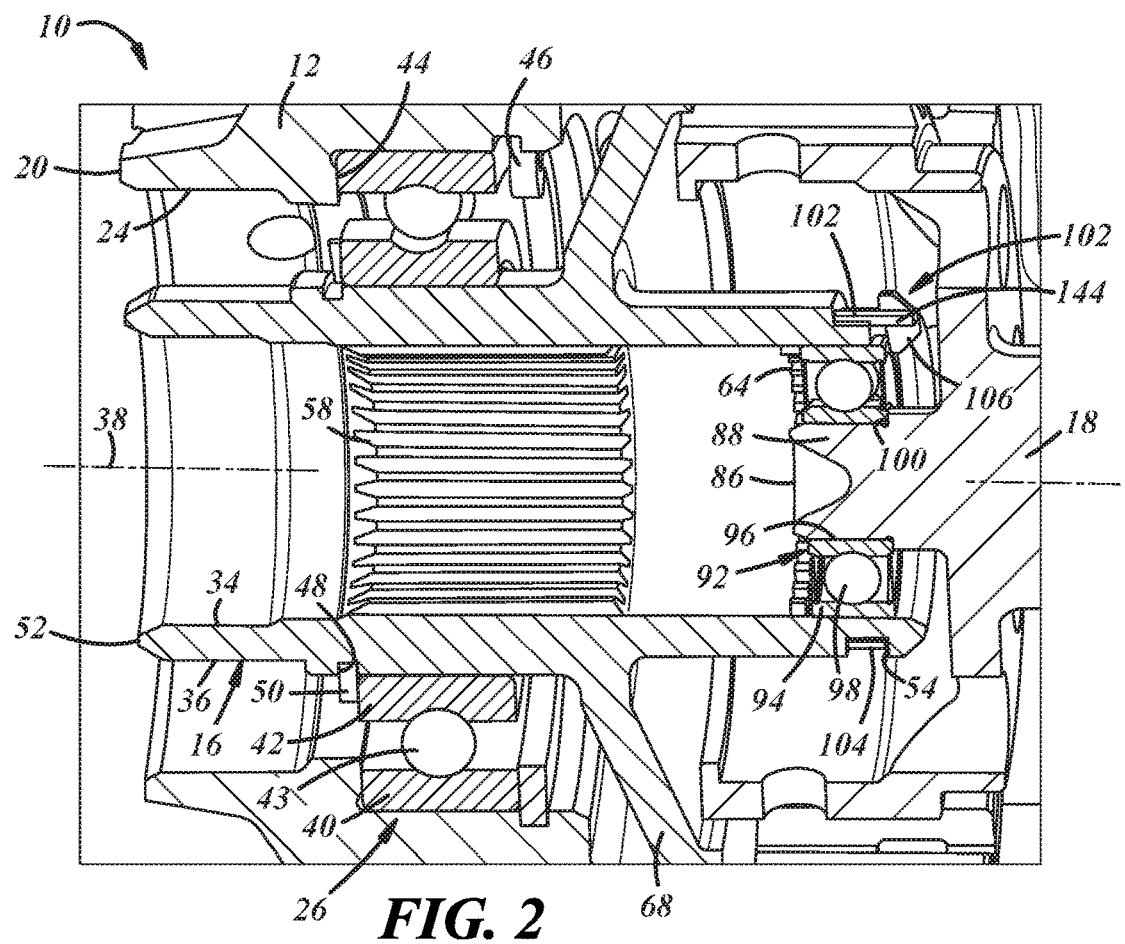
FIG. 2 is an enlarged, fragmentary view of a portion of FIG. 1.
Figure 3:
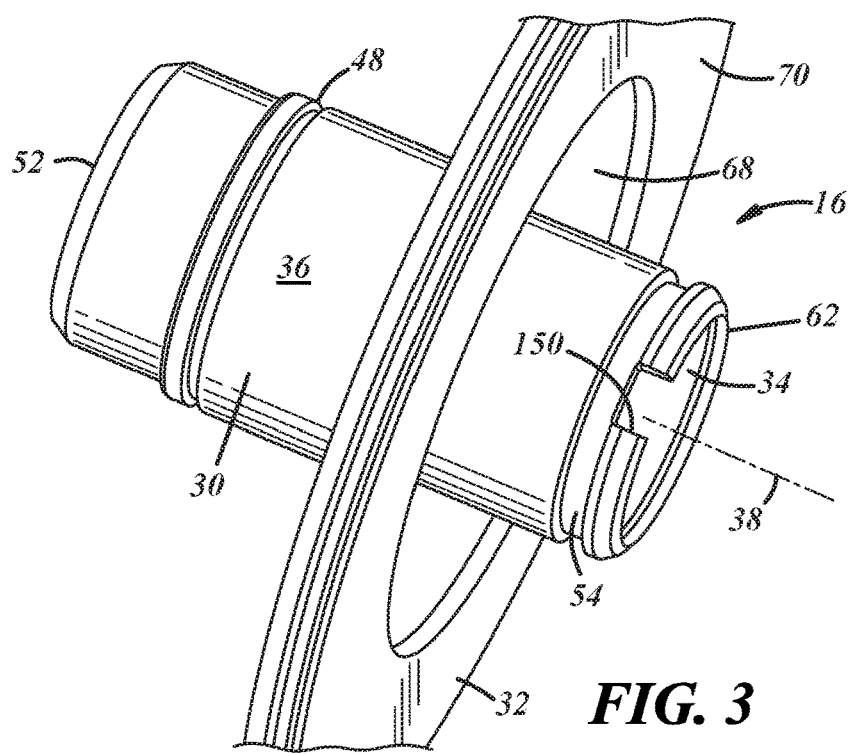
FIG. 3 is a perspective view of a portion of a first shaft of the drive unit.
Figure 4:
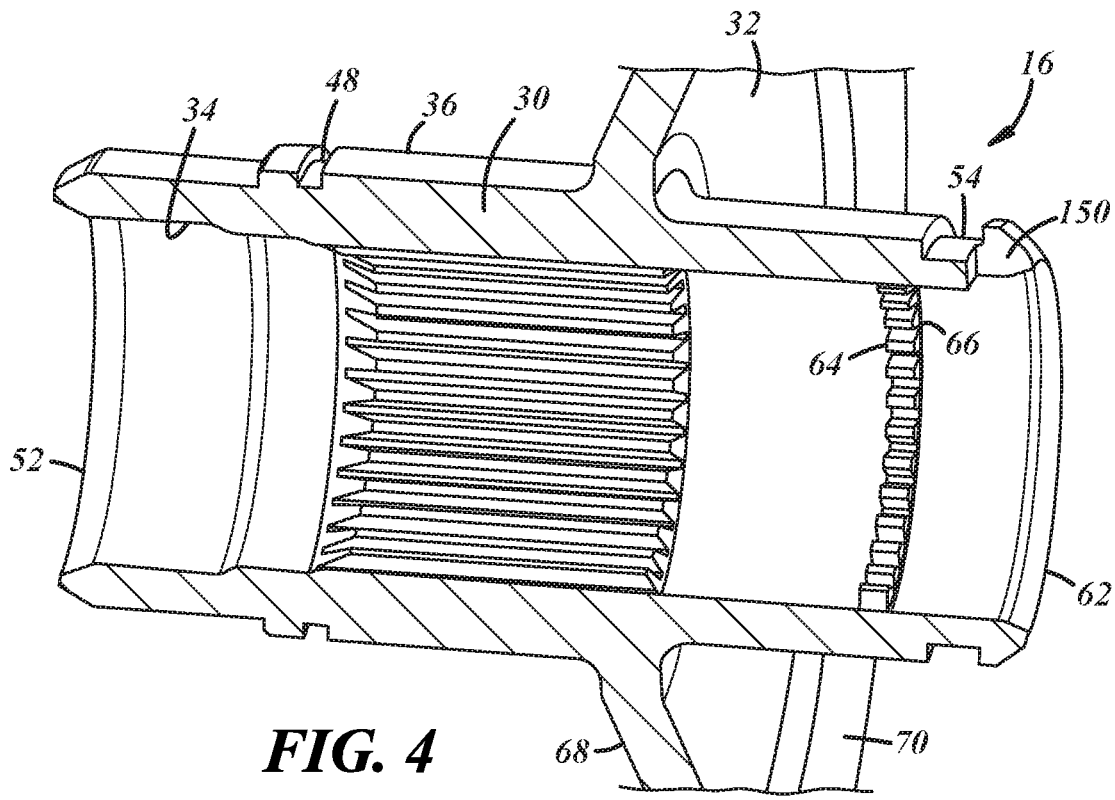
FIG. 4 is a sectional view of a portion of the first shaft.
Figure 5:
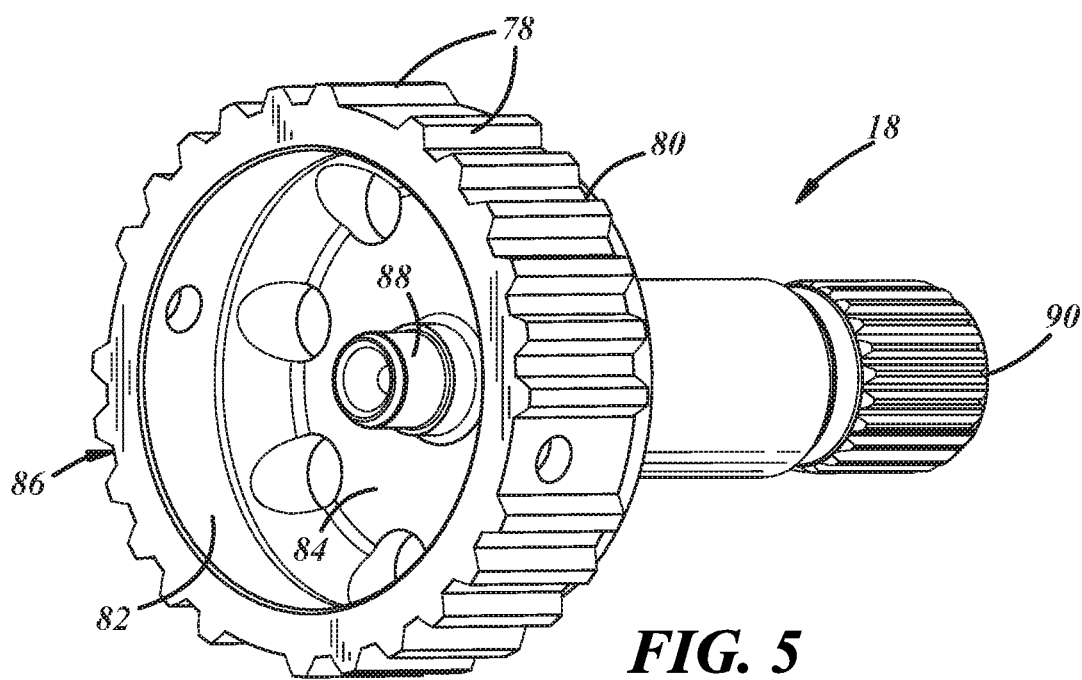
FIG. 5 is a perspective view of a second shaft and inner disc carrier of the drive unit.

The main body 30 may be arranged to receive a drive shaft 56 at the first end 52 of the main body 30. The drive shaft 56 may be attached in any suitable way to the first shaft 16 including arrangements engaging the exterior surface or interior surface or both, of the first shaft. In the implementation shown, the main body 30 includes internal splines 58 and the drive shaft 56 may have complementary splines 60 extending outwardly from an outer surface thereof to mate with the main body for co-rotation of the drive shaft 56 and first shaft 16. The main body 30 may be open at both ends (i.e. the first end 52 and a second end 62), with the drive shaft 56 received in and coupled to the first end 52 and the second shaft 18 coupled to the second end 62. One or more projections 64 may be provided in the area of the second end 62 to receive and locate an adjacent component, as will be set forth in more detail below. As shown in FIGS. 2 and 4, in one embodiment the projection 64 includes one or more tabs or an annular shoulder defining an axially facing stop surface 66 (FIG. 4) extending inwardly from the interior surface 34 of the first shaft 16.

The first shaft 16 may also include or be coupled with the flange 32 that extends radially outwardly from the main body 30. In other words, the flange 32 may be formed integrally from and in the same piece of material as the main body 30 or the flange 32 may be separately formed from the main body 30 and later attached to the main body (e.g. by welding, fasteners or otherwise) for co-rotation with the main body about the axis 38. The flange 32 may have an outer diameter that is greater than the diameter of the passage 24. Hence, the flange 32 is received within the larger interior cavity 14 and the first shaft 16 is installed in the direction noted above, from the second end 22 toward the first end 20 of the housing 12. The flange 32 may be of any desired size and shape. In the example shown, the flange 32 has a generally frustoconical or tapered base 68 coupled to the main body 30 and a generally flat or planar outer section 70 oriented in a plane that is perpendicular (or within 20 degrees of perpendicular) to the axis 38.

The flange 32 may be coupled to friction clutch 72 that couples together the first shaft 16 and second shaft 18. In the example shown, the friction clutch 72 includes a multi-plate clutch pack and the flange 32 is coupled to an outer plate or outer disc carrier 74 that surrounds the friction plates. In this way, the carrier 74 is coaxially arranged with the first shaft 16 and coupled to the first shaft for rotation with the first shaft. The carrier 74 could be formed integrally with the flange 32 or it may be coupled thereto in any desired way. The outer carrier 74 includes inwardly extending teeth 76 that are adapted to engage outwardly extending teeth on the clutch plates (not shown). The friction plate may also have teeth adapted to engage outwardly extending teeth 78 on an inner plate or inner disc carrier 80. In the example shown, the inner disc carrier 80 is formed as part of or otherwise coupled to the second shaft 18 for co-rotation with the second shaft. The inner disc carrier 80 may be annular and have an inner surface 82 opposite the teeth 78 and, at least in some implementations, of a diameter larger than the other diameter of the first shaft 16. A support 84 may extend between the second shaft 18 and one side of the inner carrier 80 to couple the inner carrier to the second shaft 18. The support 84 may include a plate, or one or more fingers of material extending between the shaft and inner carrier (i.e. it may be solid or include voids, as desired). The support 84, inner carrier 80 and second shaft 18 may all be formed from the same piece of material, or they may be separately formed from two or more pieces of material that are joined together during or after their formation. The other side of the inner carrier 80 may be open providing a cup-shaped or concave section. In this way, at least part of the inner carrier 80 may axially overlap and radially surround part of the first shaft 16, including the second end 62 of the first shaft 16.

The inner carrier 80 may also axially overlap and radially surround part of the second shaft 18, in the example shown, a first end 86 of the second shaft 18. The first end 86 may be defined by or include a projection 88 that extends axially beyond or outwardly relative to the support 84. The projection 88 may have an outer diameter smaller than the inner diameter of the second end 62 of the first shaft 16, so that the projection 88 may be at least partially received within the second end of the first shaft. A second end 90 of the second shaft 18 may extend outwardly from the housing 12 to be coupled with another driveline component, such as, but not limited to, a spool shaft or a differential. The second shaft 18 could instead be the input shaft and thereby drive the first shaft and an output shaft coupled to the first shaft. In the example shown, the second shaft 18, other than the support 84 and projection 88, may be of generally constant diameter, and that diameter may be greater than the diameter of the projection, if desired.

The second shaft 18 may be journalled for rotation at its first end by a bearing 92 that may be received between the first shaft 16 and second shaft 18 to mutually journal the second end 62 of the first shaft 16 and the first end 86 of the second shaft 18, and permit relative rotation between the first shaft 16 and second shaft 18. That is, because the first shaft 16 is coupled to the outer carrier 74 and the second shaft 18 is coupled to the inner carrier 80, the first shaft and second shaft may rotate at different speeds. Further, one shaft may be held against rotation while the other shaft rotates. Instead of the clutch 72, the first and second shafts 16, 18 may be selectively coupled together by a gear train, such as a planetary gear set arranged between them so that the shafts 16, 18 rotate together when the gear train is actuated and relative rotation is permitted between the shafts when the gear train is not actuated.

In at least some implementations, the bearing 92 is received within the second end 62 of the first shaft 16, and around the projection 88 or first end 86 of the second shaft 18. The bearing 92 is therefore annular, and as shown in FIG. 2, includes an outer race 94 adjacent to the interior surface 34 of the first shaft 16, an inner race 96 adjacent to the outer surface of the projection 88 and a plurality of balls or other intermediate elements 98 between the races 94, 96 to permit relative movement of the races. In this way, the outer race 94 rotates with the first shaft 16 and the inner race 96 rotates with the second shaft 18. To position the bearing 92 relative to the second shaft 18, the second shaft 18 may include a stop surface or shoulder 100, which may also be defined by a retainer such as a c-shaped clip on the shaft, that limits the extent to which the bearing 92 may be received on the projection 88. The inner race 96 may be pressed onto, otherwise friction fit, adhered or welded to the second shaft 18 to retain the bearing on the second shaft 18, or a retainer such as a c-clip may be provided on the shaft 18 to inhibit or prevent removal of the bearing from the projection. In this way, the bearing 92 may be retained on the second shaft 18 with little or no axial movement permitted between them.

The position of the bearing 92 relative to the first shaft 16 may be controlled by the stop surface 66 in the interior of the first shaft 16 and a retainer 102 that is coupled to the first shaft 16. Insertion of the bearing 92 into the first shaft 16 is limited by engagement of the outer race 94 with the stop surface 66. Movement of the bearing 92 in the opposite direction, which would remove the bearing 92 from the first shaft 16, is prevented by engagement of the bearing with a portion of the retainer 102. In this regard, the retainer 102 includes a portion that extends inwardly from a surface of the first shaft 16 toward the axis 38 of the first shaft 16.

In at least some implementations, the retainer 102 includes a body 104 and a finger 106. The body 104 may have a curved section 108 extending in a circumferential direction about an axis 110 and a pair of ends 112, 114. To facilitate installation of the retainer 102 onto the first shaft 16, the ends 112, 114 may be spaced apart or separate so that the body 104 is generally C-shaped. To facilitate retention of the retainer 102 on the first shaft 16, the body 104 may extend circumferentially between the ends 112, 114 more than 180 degrees. The body 104 has an inner surface 116 facing toward the axis 110 and having a width in the axial direction, and an outer surface 118 facing away from the axis 110 also having a width in the axial direction. The body 104 may have a forward facing surface 120 and an opposite, rearward facing surface 122 that extend between the inner surface 116 and outer surface 118 and define a radial thickness of the body. The forward and rearward facing surfaces 120, 122 may be oriented parallel to a plane 124 that is perpendicular or nearly perpendicular (i.e. within 10 degrees) to the axis 110. The forward facing surface 120 may be oriented closer to and facing the second end 62 of the first shaft 16 in assembly.

The finger 106 may be carried by and cantilevered from the body 104. In this way, the finger 106 may have a base 126 coupled to the body 104 and the finger extends from the body to a distal or free end 128 spaced from the body. At least a portion of the finger 106 extends inwardly toward the axis 110, and may extend inwardly so that it is closer to the axis 110 than the inner surface 116 of the body 104. The finger 106 may be flexible and have an at rest state and a second state wherein the finger is flexed or bent outwardly away from the axis 110 when acted upon by a sufficient force during assembly. The finger 106 may also be resilient (and not significantly plastically or permanently deformed during assembly of the second shaft) so that the finger returns automatically to or at least partially toward its at rest state when the force is reduced or removed from the finger. The finger 106 and body 104 may be formed from the same piece of material or the finger may be formed separately from the body and coupled thereto, such as by a fastener, bonding, adhering or welding. In at least some examples, the retainer 102 is formed from a stamped metal or a molded plastic or composite material.

Figure 6:
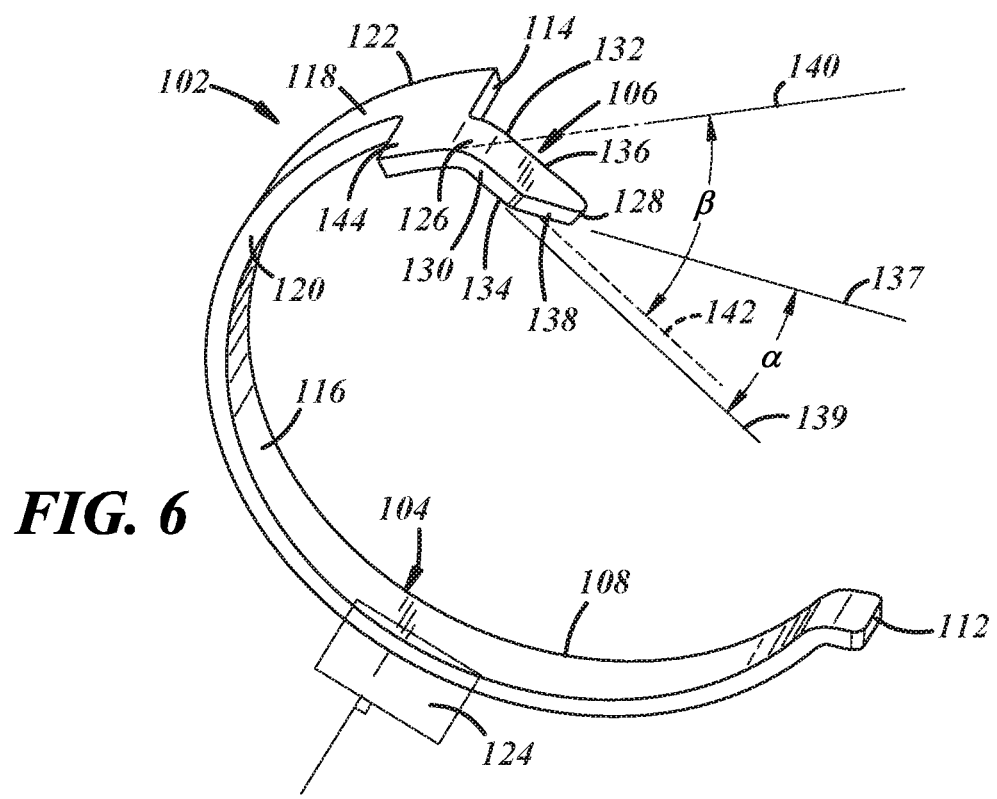
FIG. 6 is perspective view of a retainer.
Figure 7:
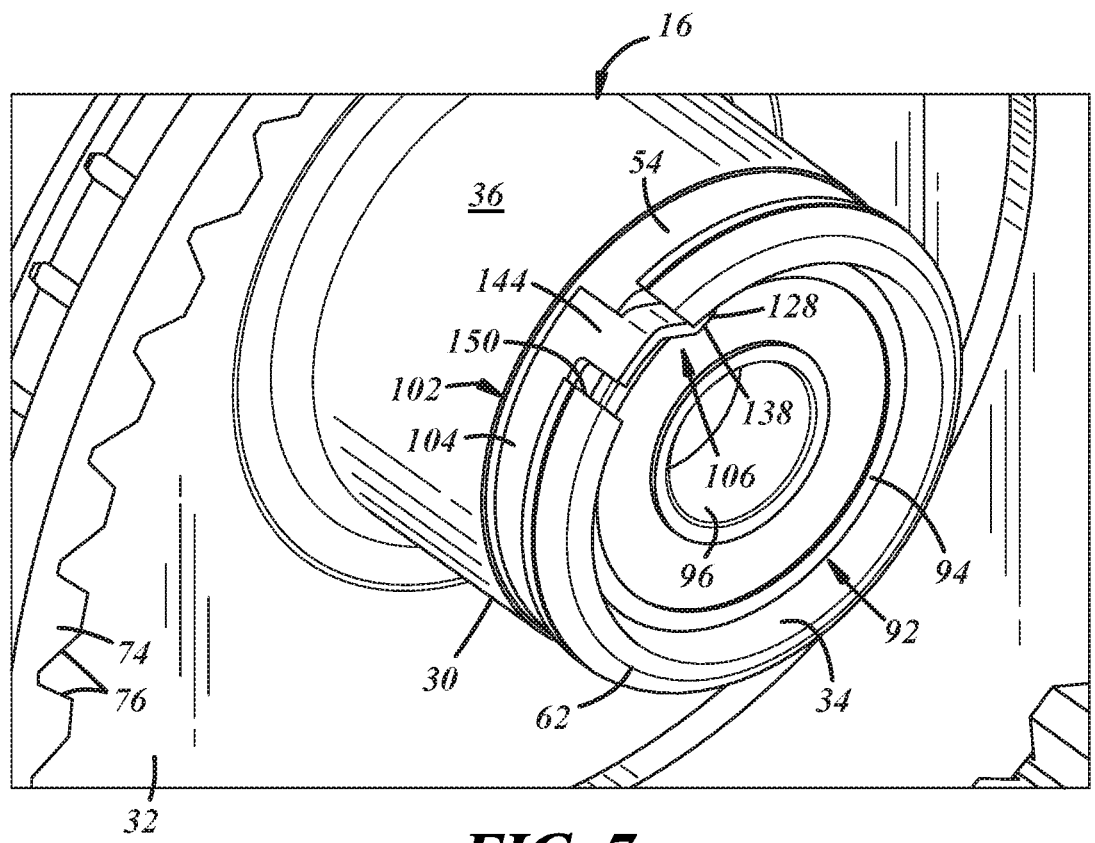
FIG. 7 is a perspective view of a portion of the first shaft, a bearing received in the first shaft and the retainer with the second shaft removed for ease of illustrating the relationship between the first shaft, retainer and bearing.

Like the body 104, the finger 106 may have a forward facing surface 130 and an opposite, rearward facing surface 132 that extend between an inner surface 134 and outer surface 136 and define a radial thickness of the finger. The forward facing surface 130 may be oriented closer to and facing the second end 62 of the first shaft 16 in assembly. As shown in FIGS. 2 and 6, the forward facing surface 130 may include at least a portion 138 that is inclined relative to the axis 110. The inclined portion 138 may be oriented at an angle α to the forward facing surface 130 (e.g. at an angle to a plane that is perpendicular to the axis 110) of between 15 and 75 degrees, as shown between a line 137 extending from the face of the inclined portion 138 and a line 139 extending from the forward facing surface 130 of the finger. In this example, the forward facing surface 130 is parallel to (and axially offset from) the forward facing surface 120 of the body, but it need not be. The inclined portion 138 may extend from a) the base 126, or b) a location between the base 126 and the free end 128 to the free end 128 of the finger 106 and may extend from the forward facing surface 130 toward the rearward facing surface 132 so that the axial dimension of the finger 106 decreases toward the free end 128 or tip of the finger 106. In at least some implementations, at least part of the finger 106 is arranged at an included angle β of between zero and 60 degrees relative to a line 140 tangent to the base 126 of the finger 106. In the example shown, the angle is drawn between the line 140 and a line 142 extending from the forward facing surface of the finger. Also in at least some implementations, a portion of the finger 106 may be at least 3 mm closer to the axis 110 than the inner surface 116 of the curved section 108 of the body 104.

Further, in at least some implementations, the inclined portion 138 could be beveled or tapered in a radial direction. In such an arrangement, the radial dimension of the finger 106 increases from the forward facing surface 130 to the rearward facing surface 132 and an object that engages the finger 106 at or near the forward facing surface and is moved toward the rearward facing surface of the finger 106 tends to radially outwardly displace the finger 106 to facilitate axial movement of the object past the finger.

In at least some implementations, the body 104 may include an extension 144 that extends axially from the curved section 108 and interconnects the finger 106 and the curved section 108. The extension 144 may extend axially away from the rearward facing surface 122 of the curved section 108 (i.e. in the direction that the forward facing surface faces). This positions at least part of the finger 106 axially forward of at least part of the curved section 108 of the body 104. Doing so may facilitate retention of the curved section 108 in the groove 54 of the first shaft 16 that is spaced axially from the second end 62 of the first shaft 16, while permitting the finger 106 to be closer to, even with or forward of the second end 62.

As shown in FIGS. 1-4 and 7, the first shaft 16 may include a retention feature formed in or defining part of the exterior surface 36 and adapted to maintain the retainer 102 in a desired position on the first shaft. In at least some implementations, the retention feature includes the groove 54 that extends radially inwardly from the exterior surface 36 of the first shaft 16 to a depth sufficient to receive and retain the body 104 of the retainer 102 between opposed axially facing shoulders 146. The groove 54 may extend along all or part of the circumference of the first shaft 16 and may be generally complementary to the shape of the retainer 102. In other words, the groove 54 may have an axial width slightly larger than the axial dimension of the curved section 108 to axially locate the retainer 102 on the first shaft 16. The inner diameter or dimension of the retainer 102 may be close to the outer diameter of the base of the groove so that the retainer, in at least some implementations, is firmly received within the groove, is not loosely received in the groove 54 and does not have radial play that may interfere with the location or function of the finger as set forth herein. In at least some implementations, the retainer 102 may be sized so that it resiliently flexes when installed in the groove 54, and the distance between the ends increases slightly in the installed state compared to the at rest state.

Further, to accommodate the extension 144, an axially extending slot 150 (FIGS. 3, 4 and 7) may be formed in the first shaft 16 that connects with the groove 54. In the example shown, the slot 150 extends to the second end 62 of the first shaft 16 while the groove 54 is axially spaced from the second end 62. Further, at least a portion of the slot 150 is formed or defines an opening extending axially through the first shaft 16 and is open to the interior of the first shaft 16. In assembly, the curved section 108 of the retainer 102 is received within the groove 54, the retainer extension 144 is received axially in the slot 150 and the finger 106 may be received in or adjacent to the slot 150 and extends inwardly toward the axis 38 of the first shaft 16. So arranged, the free end 128 of the finger 106 is closer to the axis 38 than is the interior surface 34 of the first shaft 16 at the second end 62 of the first shaft 16. Thus, the finger 106 partially blocks part of the open area of the second end 62 of the first shaft 16, and in that way, defines a minimum radial dimension for an object to be inserted in to the first shaft. In other words, an object having an outer diameter closely matched the inner diameter of the second end 62 will engage the finger 106 upon insertion into the first shaft 16.

In the example shown, the outer race 94 of the bearing 92 on the second shaft 18 engages the finger 106 and flexes the finger (generally radially outwardly) to permit the bearing 92 to pass the finger 106. In more detail, the bearing 92 may engage the inclined portion 138 of the finger 106 to facilitate flexing of the finger out of the way of the bearing 92 as the bearing is axially inserted into the first shaft 16. When the bearing 92 has been moved axially past the finger 106, the finger may return to or toward its at rest or unflexed state whereupon a portion of the finger radially overlaps part of the bearing 92. The unflexing or return movement of the finger 106 may occur automatically due to the resilient properties of the material of the finger/retainer. In this way, the rearward facing surface 132 of the finger 106 confronts the bearing 92 and inhibits or prevents removal of the bearing from the first shaft 16. The rearward facing surface 132 may define a retaining surface and be generally radially oriented (i.e. not inclined) and is thereby perpendicular or nearly so to axial movement of the bearing 92 so that engagement of the bearing with the finger 106 in the removal direction does not tend to radially outwardly flex the finger. The bearing 92 may be further axially retained and located by engagement with the projection(s) 64 on the interior surface 34 of the first shaft 16. Hence the bearing 92 may be definitively located between the finger 106 and projection(s) 64, and firmly retained within the first shaft 16.

Further, the flexing and unflexing of the finger 106 may occur automatically as the second shaft 18 is inserted into the first shaft 16. This facilitates accurately coupling of the shafts 16, 18 even when access to the mating ends 62, 86 of the shafts is obscured or covered. In the example shown, the area around the second end 62 of the first shaft 16 is covered or enclosed by one or more other structures. In assembly, the inner carrier 80, support 84, second shaft 18 and flange 32 prevent access to the second end 62 of the first shaft 16 so that a retainer (e.g. a clip) to couple together the first and second shafts 16, 18 cannot be installed after the second shaft 18 is inserted into the first shaft 16. Of course, the retainer 102 as described herein could also be used in implementations wherein access to the second end 62 of the first shaft 16 is not prevented, to facilitate assembly or for other reasons.

Another implementation of a driveline component with a retainer 160 is shown in FIGS. 8-13. Although other driveline components can be used as noted above, this implementation shows a similar rear drive unit 10 as in FIGS. 1-7. Accordingly, only the differences between the implementations will be described with regard to the arrangement shown FIGS. 8-13. To further simplify the further discussion, the same reference numbers will be used to denote the same or similar components.

Figure 8:
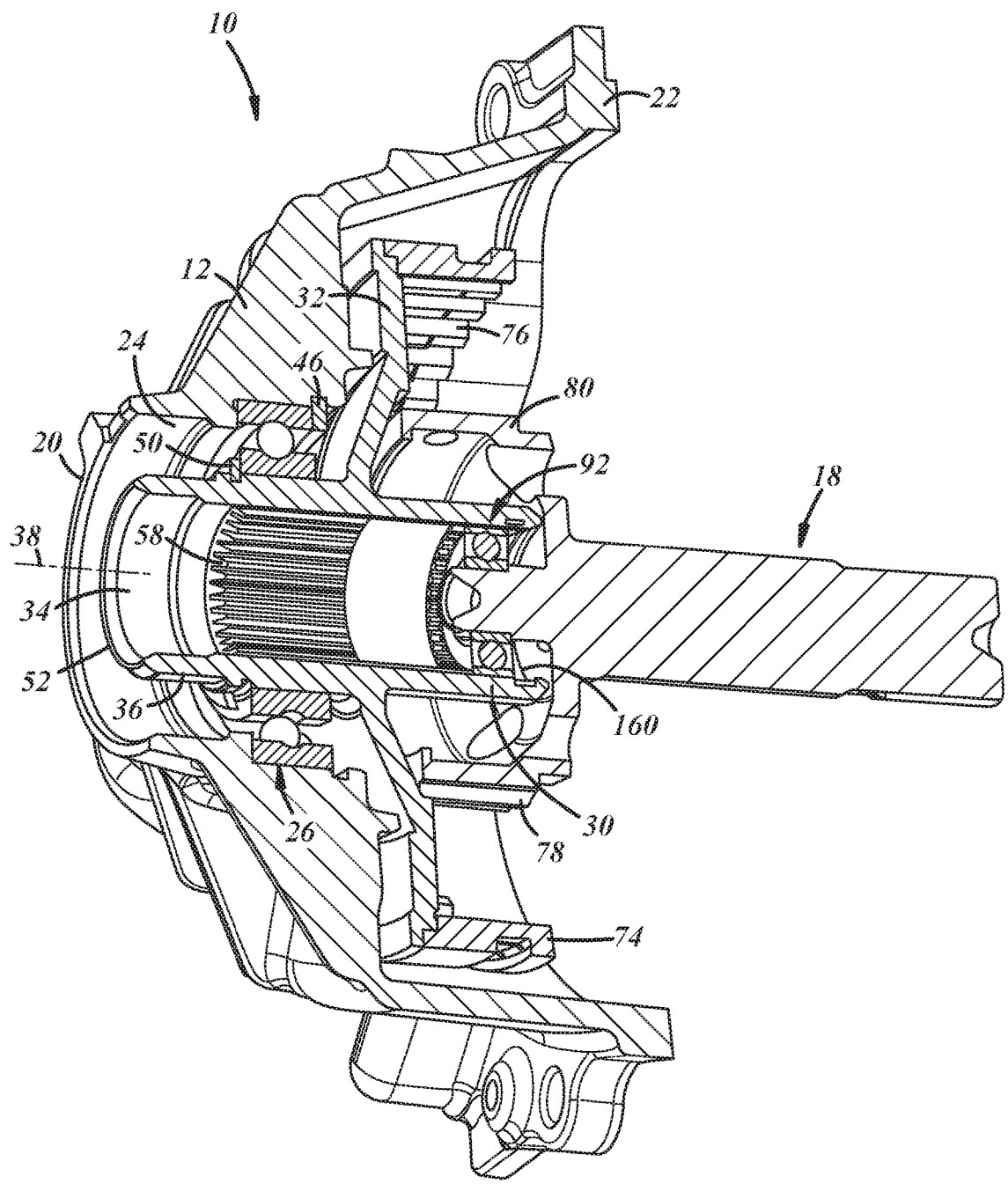
FIG. 8 is a cross-sectional view of a portion of a vehicle final drive unit.
Figure 9:
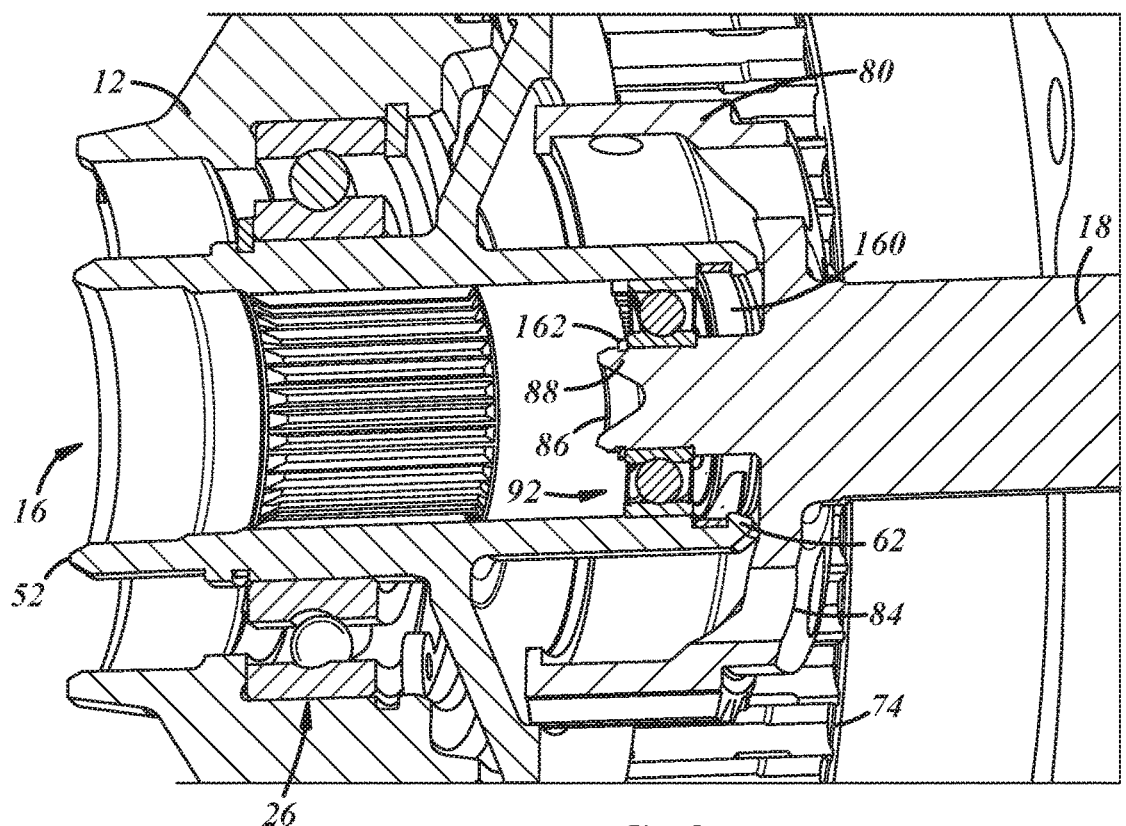
FIG. 9 is an enlarged, fragmentary view of a portion of FIG. 8.
Figure 10:
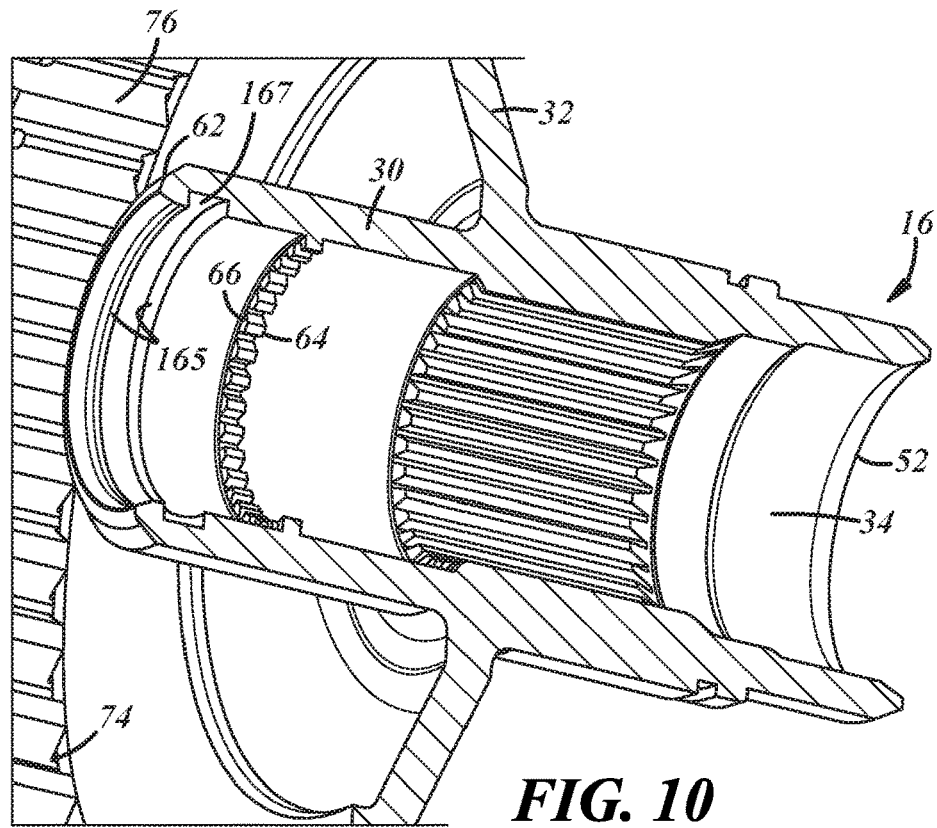
FIG. 10 is a sectional view of a portion of the first shaft.

As shown in FIGS. 8 and 9, the bearing 92 is retained on the second shaft 18 by a clip 162 instead of or in addition to an interference fit. Next, instead of being received in a groove 54 in the outer surface 36 of the first shaft 16, the retainer 160 is received at least partially within a groove 164 (FIGS. 10 and 12) formed in the interior surface 34 of the first shaft 16. The groove 164 may include annular or partially circumferential shoulders 165 defined by a depth of the groove and extending to a base 167 located radially outwardly from the interior surface 34 of the second end 62 of the first shaft 16. The groove 164 may have a constant axial width, and/or constant radial depth, or other shape, as desired to receive and hold the retainer 160.

Figure 11:
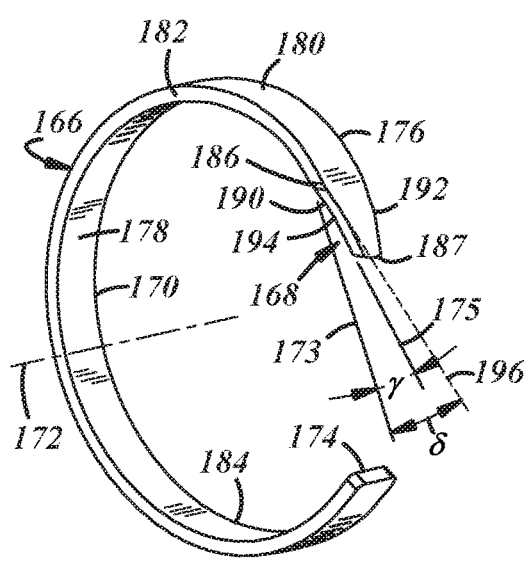
FIG. 11 is perspective view of a retainer.
Figure 13:
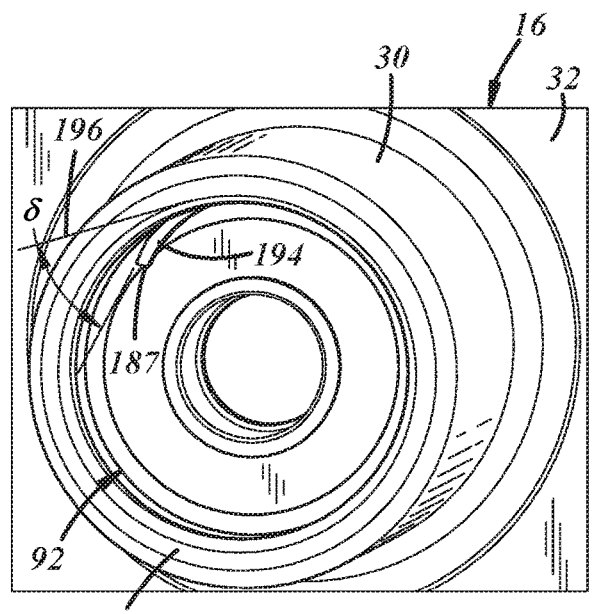
FIG. 13 is a sectional view showing the components shown in FIG. 12 to illustrate the first shaft, retainer and bearing.
Figure 12:
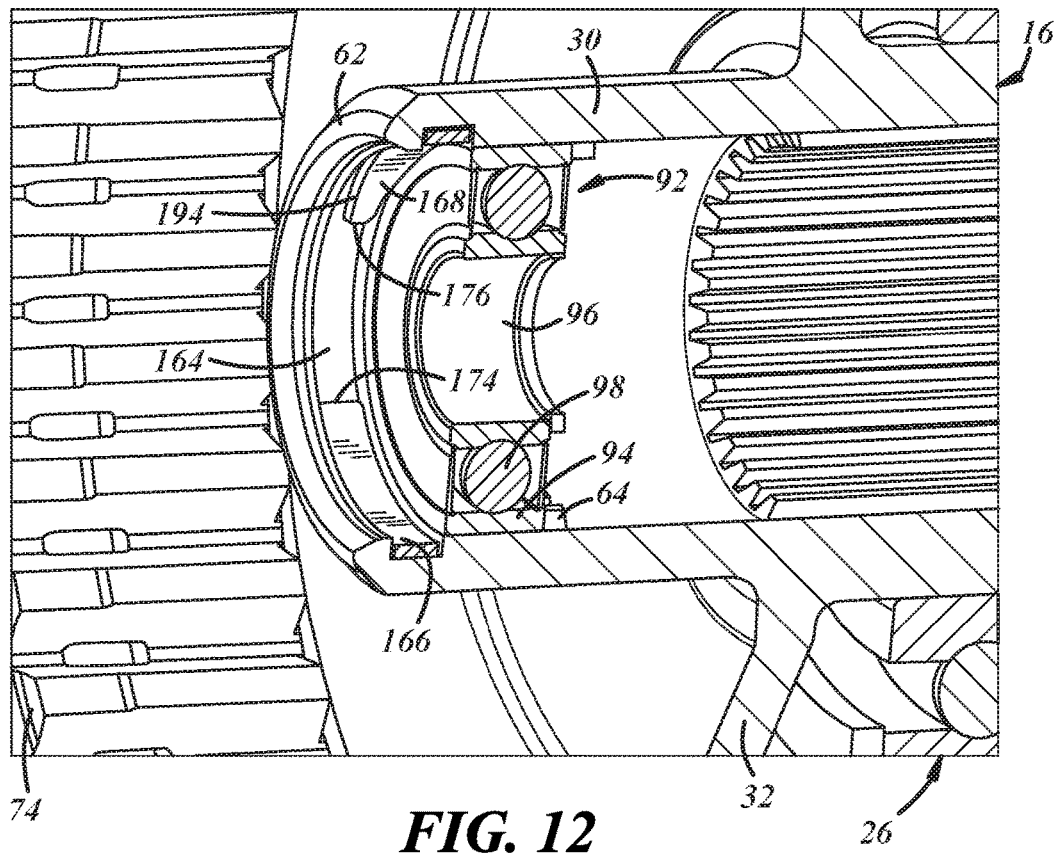
FIG. 12 is a perspective view of a portion of the first shaft, a bearing received in the first shaft and the retainer with the second shaft removed for ease of illustrating the relationship between the first shaft, retainer and bearing.

In at least some implementations, the retainer 160, as best shown in FIG. 11, includes a body 166 and a finger 168. The body 166 may have a curved section 170 extending in a circumferential direction about an axis 172 and a pair of ends 174, 176. To facilitate installation of the retainer 160 into the groove 164 in the first shaft 16, the ends 174, 176 may be spaced apart or separate so that the body is generally C-shaped and may be compressed to reduce its outer diameter for insertion into the second end 62 of the first shaft 16. To facilitate retention of the retainer 160 in the groove 164, the body 166 may extend circumferentially between the ends 174, 176 more than 180 degrees (end 176 may be defined at or by a base of the finger as set forth below). The body 166 has an inner surface 178 facing toward the axis 172 and having a width in the axial direction, and an outer surface 180 facing away from the axis 172 also having a width in the axial direction. The body 166 may have a forward facing surface 182 and an opposite, rearward facing surface 184 that extend between the inner surface 178 and outer surface 180 and define an axial thickness of the body which may, in at least some implementations, be closely matched to the axial dimension of the groove 164 to limit axial movement of the retainer 160 relative to the first shaft 16. The forward and rearward facing surfaces 182, 184 may be oriented in a plane that is perpendicular or nearly perpendicular (i.e. within 10 degrees) to the axis 172. The forward facing surface 182 may be oriented closer to and facing the second end 62 of the first shaft 16.

The finger 168 may be carried by and cantilevered from the body 166. In the implementations shown in FIGS. 8-13, the finger 168 is an extension of the body 166 and is circumferentially aligned with the body. That is, there is no axially extending extension to axially offset the finger from the body, although there could be if desired. In this way, the finger 168 may have a base 186 coupled to the body 166 and the finger extends from the body to a distal or free end 187 (the end of the finger could also, in at least some implementations, be considered to be the end of the body 166). At least a portion of the finger 168 extends inwardly toward the axis 172, and may extend inwardly so that it is closer to the axis than the inner surface 178 of the body 166. The finger 168 may be flexible and have an at rest state and a second state wherein the finger is flexed or bent outwardly away from the axis 172 when acted upon by a sufficient force. The finger 168 may also be resilient so that the finger returns automatically toward its at rest state when the force is reduced or removed from the finger. The finger 168 and body 166 may be formed from the same piece of material or the finger may be formed separately from the body and coupled thereto, such as by a fastener, bonding, adhering or welding. In at least some examples, the retainer 160 is formed from a stamped metal or a molded plastic or composite material.

Like the body 166, the finger 168 may have a forward facing surface 190 and an opposite, rearward facing surface 192 that extend between the inner surface 178 and outer surface 180 and define a radial thickness of the finger 168. The forward facing surface 190 may be oriented closer to and facing the second end 62 of the first shaft 16 in assembly. As shown in FIGS. 9 and 11-13, the forward facing surface 190 may include at least a portion 194 that is inclined relative to the axis 172. The inclined portion 194 may be oriented at an angle γ away from the forward facing surface 190 (e.g. at an angle to a plane that is perpendicular to the axis 172), which in at least some implementations may be between 15 and 75 degrees. In the example shown, the angle γ is shown between a line 173 extending from the forward facing surface 182 of the body and a line 175 extending from the inclined portion 194. The inclined portion 194 may extend from a) the base 186, or b) a location between the base and the free end 188, to the free end 188 of the finger 168 and may extend from the forward facing surface 190 toward the rearward facing surface 192 so that the axial dimension of the finger decreases toward the free end or tip of the finger. In at least some implementations, at least part of the finger 106 is radially inclined or bent at an included angle δ (FIGS. 11 and 13) of between zero and 60 degrees relative to a line 196 tangent to the base 186 of the finger 168 and the line 173. Also in at least some implementations, a portion of the finger 168 may be at least 2 mm closer to the axis 172 than the inner surface 178 of the curved section 170 of the body 166.

Further, in at least some implementations, the inclined portion 194 could be beveled or tapered in a radial direction. In such an arrangement, the radial dimension of the finger 168 increases from the forward facing surface 190 to the rearward facing surface 192 and an object that engages the finger at or near the forward facing surface and is moved toward the rearward facing surface of the finger tends to radially outwardly displace the finger to facilitate axial movement of the object past the finger. In the implementations shown, the object is a bearing 92 coupled to or otherwise carried by the second shaft 18 and used to journal for rotation the second end 62 of the first shaft 16 and the first end 86 of the second shaft 18.

In the example shown, the outer race 94 of the bearing 92 on the second shaft 18 engages the finger 168 and flexes the finger (generally radially outwardly into the groove) to permit the bearing to pass the finger. In more detail, the bearing 92 may initially engage the inclined portion 194 of the finger 168 to facilitate flexing of the finger out of the way of the bearing as the bearing is axially inserted into the first shaft 16. When the bearing 92 has been moved axially past the finger 168, the finger may return to or toward its at rest or unflexed state whereupon a portion of the finger radially overlaps part of the bearing. The unflexing or return movement of the finger 168 may occur automatically due to the resilient properties of the material of the finger/retainer. In this way, the rearward facing surface 192 of the finger 168 confronts the bearing 92 and inhibits or prevents removal of the bearing from the first shaft 16. The rearward facing surface 192 may define a retaining surface and be generally radially oriented (i.e. not inclined) and is thereby perpendicular or nearly so to axial movement of the bearing so that engagement of the bearing with the finger does not tend to radially outwardly flex the finger. The bearing 92 may be further axially retained and located by engagement with the projection(s) 64 on the inner surface 34 of the first shaft 16. Hence the bearing may be definitively located between the finger and projection(s), and firmly retained within the first shaft.

Further, the flexing and unflexing of the finger may occur automatically as the second shaft is inserted into the first shaft. This facilitates accurately coupling of the shafts even when access to the mating ends of the shafts is obscured. In the example shown, the area around the second end of the first shaft is covered or enclosed by one or more other structures as set forth above with respect to the retainer 102. Of course, the retainer 160 as described herein could also be used in implementations wherein access to the second end of the first shaft is not prevented, to facilitate assembly or for other reasons.

Figure 14:
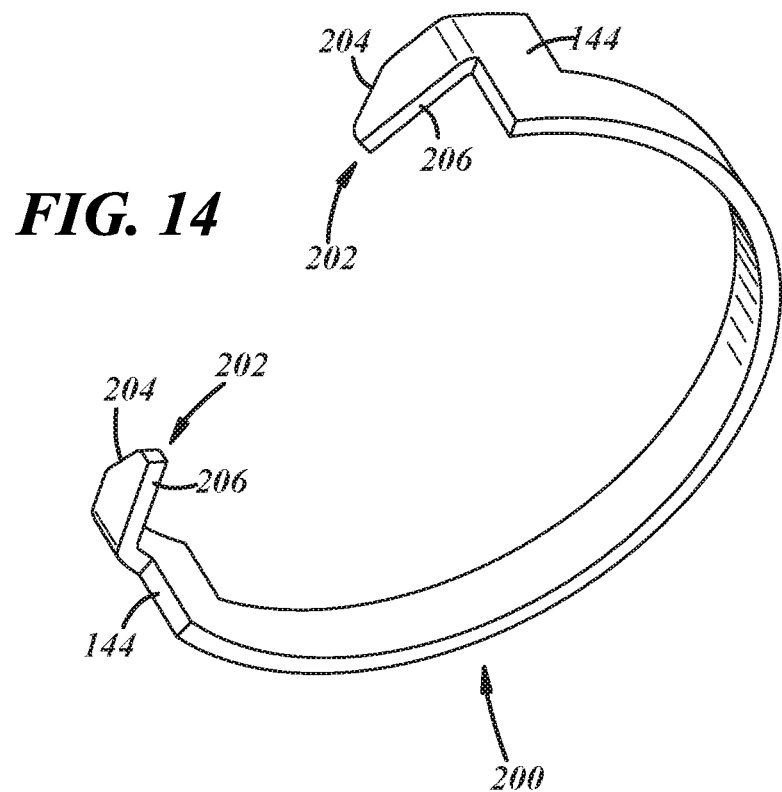
FIG. 14 is a perspective view of a retainer including a pair of fingers and retaining surfaces.
Figure 15:
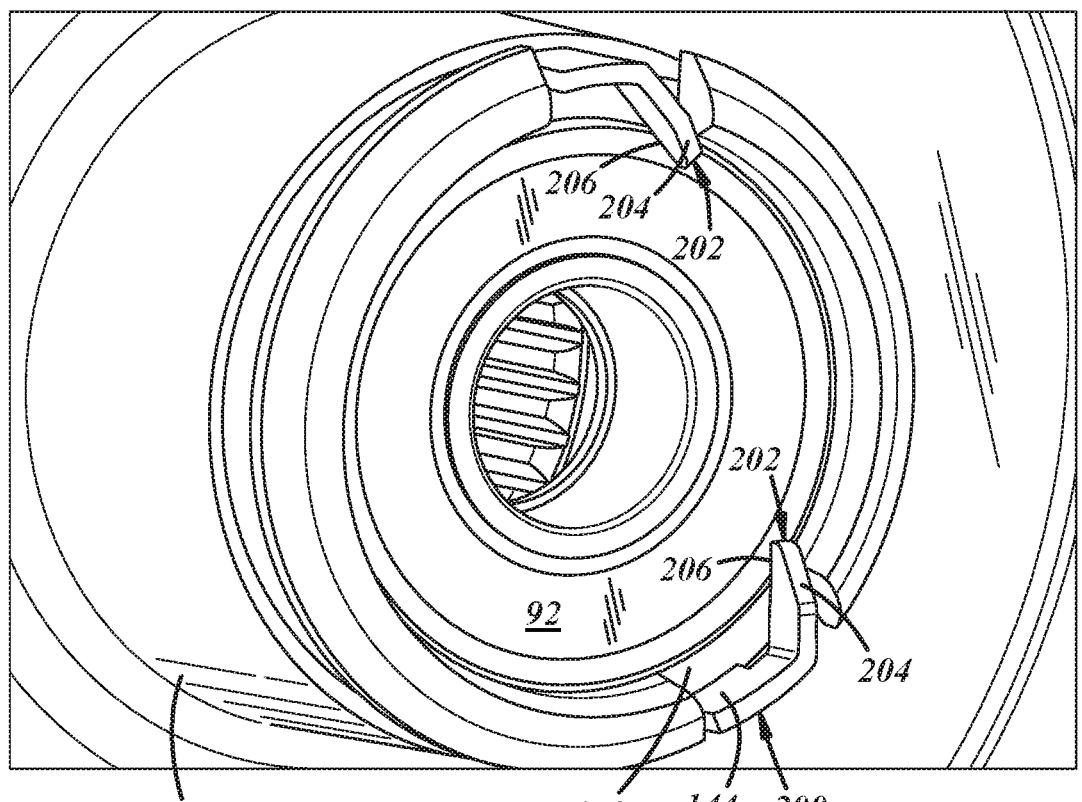
FIG. 15 is a perspective view of a portion of the first shaft, a bearing received in the first shaft and the retainer with the second shaft removed for ease of illustrating the relationship between the first shaft, retainer and bearing.

As shown in FIGS. 14 and 15, a retainer 200 may include more than one inwardly extending finger, with two fingers 202 shown on the illustrated retainer 200. Each finger 202 may be defined at an end of the C-shaped retainer 200 and the fingers 202 may be mirror images of each other. The retainer 200 may be constructed similarly to the retainer 102 with the fingers 202 including the same features and functions of the finger 106. Thus, the fingers may each include an inclined portion 204 engaged by the component being inserted into the first shaft 16 and an opposite retaining surface 206 that overlies the component after insertion. Likewise, the first shaft may be constructed to accommodate both fingers 202.

Figure 16:
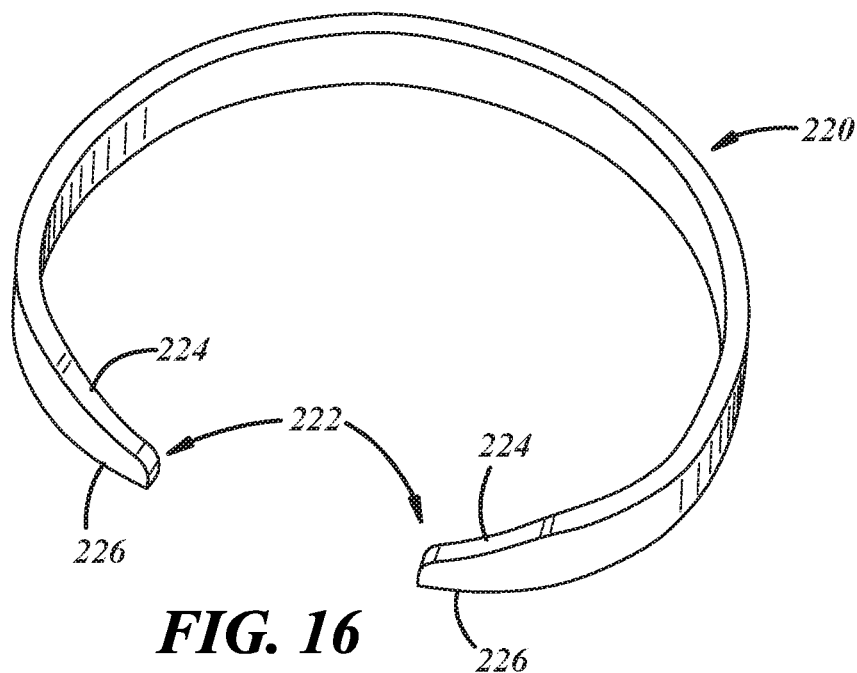
FIG. 16 is a perspective view of a retainer including a pair of fingers and retaining surfaces.
Figure 17:
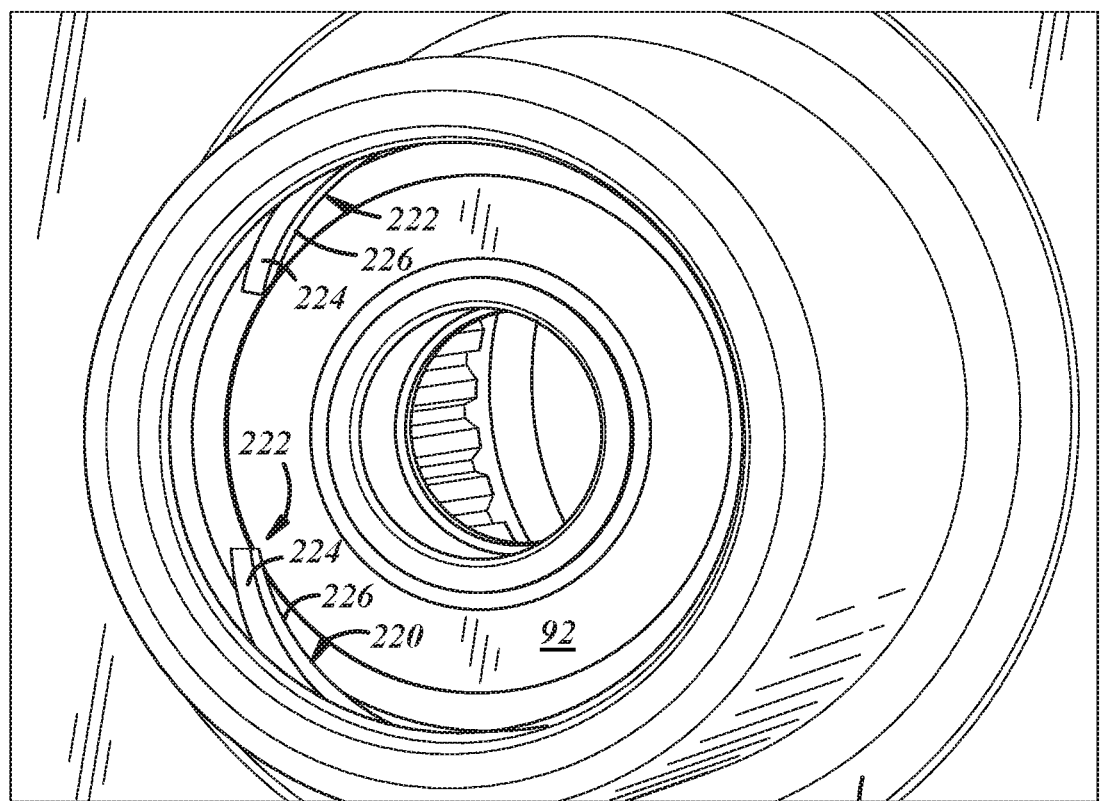
FIG. 17 is a perspective view of a portion of the first shaft, a bearing received in the first shaft and the retainer with the second shaft removed for ease of illustrating the relationship between the first shaft, retainer and bearing.

Similarly, FIGS. 16 and 17 illustrate a retainer 220 having two fingers 222. Each finger 222 may be defined at an end of the C-shaped retainer 220 and the fingers 222 may be mirror images of each other. The retainer 220 may be constructed similarly to the retainer 160 with the fingers 222 including the same features and functions of the finger 168. Thus, the fingers 222 may each include an inclined portion 224 engaged by the component being inserted into the first shaft 16 and an opposite retaining surface 226 that overlies the component after insertion.

While the forms of the invention herein disclosed constitute presently preferred embodiments, many others are possible. For example, the retainer may have more than one finger, such as a finger adjacent to each end of the retainer. Each finger may extend inwardly and may function in the manner described with regard to the fingers noted herein. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A retainer for coupling rotating shafts, comprising:
a body having a curved section extending in a circumferential direction about an axis, a radial inner surface, a radial outer surface, and a pair of ends; and
a finger extending from the body having a radial inner surface and a radial outer surface, and the finger having at least a portion that extends inwardly toward the axis with at least a portion of the radial outer surface of the finger being closer to the axis than the radial outer surface of the body, the finger being flexible and resilient and having an at rest state and a second state wherein the finger is flexed outwardly from the at rest state and away from the axis and the finger returns toward its at rest state when a force flexing the finger is reduced or removed from the finger, and the finger having a forward facing surface and a rearward facing surface that both extend between the inner surface and outer surface and define a radial thickness of the finger, the rearward facing surface is axially spaced from the forward facing surface and the forward facing surface includes an inclined portion, and wherein the body includes an extension that extends axially from the curved section and interconnects the finger and the curved section.

2. The retainer of claim 1 wherein the inclined portion extends at an angle of between 15 and 75 degrees relative to a plane perpendicular to the axis of the curved section.

3. The retainer of claim 1 wherein the finger extends from a base connected to the body to a distal end and the inclined portion extends to the distal end of the finger.

4. The retainer of claim 1 wherein the curved section includes a forward facing surface and a rearward facing surface and the extension extends axially away from the rearward facing surface.

5. The retainer of claim 1 wherein the ends are spaced apart so that the body is generally C-shaped.

6. The retainer of claim 5 wherein the body spans an angle of greater than 180 degrees between the ends.

7. The retainer of claim 1 wherein the finger has a centerline arranged at an included angle of between zero and 60 degrees relative to a radius from the axis that intersects the base of the finger.

8. The retainer of claim 1 wherein the curved section includes an inner surface and a portion of the finger extends radially inwardly beyond the inner surface by at least 2 mm.

9. The retainer of claim 1 which includes a second finger extending from the body and having a least a portion that extends inwardly toward the axis, the second finger being flexible and resilient and having an at rest state and a second state wherein the second finger is flexed outwardly away from the axis and the second finger returns toward its at rest state when a force flexing the second finger is reduced or removed from the second finger.

10. The retainer of claim 1 wherein the body includes a forward facing surface and a rearward facing surface that both extend between the inner surface of the body and outer surface of the body and define a radial thickness of the body, and at least a portion of the inner surface of the finger is closer to the axis than is the inner surface of the body, at least a portion of the forward facing surface of the finger is closer to the axis than is the forward facing surface of the body, and at least a portion of the rearward facing surface of the finger is closer to the axis than is the rearward facing surface of the body.

11. An assembly, comprising:
a first shaft having an axis of rotation, an outer surface defining an outer diameter, a cavity defining an inner surface that defines an inner diameter of the first shaft and a groove having at least a portion open to the cavity;
a second shaft having an axis of rotation and at least a portion with an outer diameter smaller than the inner diameter so that said at least a portion can be at least partially received within the internal cavity; and
a retainer having a c-shaped body with a radial inner surface and a radial outer surface, the body includes a curved section received in the groove and a finger having a radial inner surface and a radial outer surface and having a least a portion that extends inwardly toward the axis in an at rest state of the finger and projects into the cavity beyond the inner surface of the first shaft with at least a portion of the radial outer surface of the finger being closer to the axis than the radial outer surface of the body, the finger being flexible and in the at rest state when not acted upon by a force sufficient to flex the finger, and the finger has a second state wherein the finger flexes outwardly away from the axis when acted upon by a sufficient force and the finger being resilient so the finger returns toward its at rest state when the force is reduced or removed from the finger, and wherein the body includes an extension that extends axially from the curved section and interconnects the finger and the curved section, and the finger has a forward facing surface and a rearward facing surface that both extend between the inner surface and outer surface and define a radial thickness of the finger, the rearward facing surface is axially spaced from the forward facing surface and the forward facing surface includes an inclined portion.

12. The assembly of claim 11 wherein the groove is formed in the outer surface of the first shaft and an inner surface of the retainer engages the first shaft in the groove.

13. The assembly of claim 12 wherein the groove includes an opening through the first shaft and wherein the finger extends radially inwardly through opening.

14. The assembly of claim 13 wherein the opening extends to an end of the first shaft and has a portion that is axially offset from the groove.

15. The assembly of claim 11 wherein the groove is formed in the inner surface of the first shaft and an outer surface of the retainer engages the first shaft within the groove.

16. The assembly of claim 11 wherein the finger includes a forward facing surface and a rearward facing surface spaced from the forward facing surface and wherein the forward facing surface includes an inclined portion.

17. The assembly of claim 16 wherein the inclined portion extends at an angle of between 15 and 75 degrees relative to a plane perpendicular to the axis of the first shaft.

18. The assembly of claim 11 wherein the retainer includes a second finger having a least a portion that extends inwardly toward the axis and projects into the cavity beyond the inner surface of the first shaft.

* * * * *